US012183902B2

(12) United States Patent
Sun et al.

(10) Patent No.: US 12,183,902 B2
(45) Date of Patent: Dec. 31, 2024

(54) APPARATUS FOR BATTERY COOLING CONSIDERING BATTERY EXPANSION

(71) Applicant: GoPro, Inc., San Mateo, CA (US)

(72) Inventors: Juntao Sun, Shenzhen (CN); Hsieh Duen Hsing, New Taipei (TW)

(73) Assignee: GoPro, Inc., San Mateo, CA (US)

( * ) Notice: Subject to any disclaimer, the term of this patent is extended or adjusted under 35 U.S.C. 154(b) by 954 days.

(21) Appl. No.: 17/260,698

(22) PCT Filed: Jul. 17, 2019

(86) PCT No.: PCT/US2019/042121
§ 371 (c)(1),
(2) Date: Jan. 15, 2021

(87) PCT Pub. No.: WO2020/018618
PCT Pub. Date: Jan. 23, 2020

(65) Prior Publication Data
US 2021/0280924 A1  Sep. 9, 2021

Related U.S. Application Data

(60) Provisional application No. 62/699,909, filed on Jul. 18, 2018.

(51) Int. Cl.
*H01M 10/613* (2014.01)
*H01M 10/0525* (2010.01)
(Continued)

(52) U.S. Cl.
CPC ..... *H01M 10/613* (2015.04); *H01M 10/0525* (2013.01); *H01M 10/623* (2015.04);
(Continued)

(58) Field of Classification Search
CPC . H01M 10/613; H01M 10/623; H01M 10/653
See application file for complete search history.

(56) References Cited

U.S. PATENT DOCUMENTS

| 6,087,036 A * | 7/2000 | Rouillard | H01M 10/6555 429/66 |
| 2012/0244404 A1* | 9/2012 | Obasih | H01M 10/6551 429/120 |

(Continued)

FOREIGN PATENT DOCUMENTS

| CN | 204651398 U | 9/2015 |
| CN | 205723870 U | 11/2016 |

(Continued)

OTHER PUBLICATIONS

International Search Report for Application No. PCT/US2019/042121, date of mailing Oct. 24, 2019, 6 pages.

(Continued)

*Primary Examiner* — Kenneth J Douyette
(74) *Attorney, Agent, or Firm* — Young Basile Hanlon & MacFarlane, P.C.

(57) ABSTRACT

Disclosed herein are implementations of a cooling apparatus for use with a battery or battery pack. The battery may be a lithium-ion battery, and the battery pack may be two or more lithium-ion batteries. A cooling apparatus may include a heatsink. The heatsink may have a clearance portion configured to allow expansion of the lithium-ion battery. The cooling apparatus may include a metal plate coupled to the heatsink. The heatsink may be configured to contact the battery on at least three sides.

20 Claims, 10 Drawing Sheets

(51) Int. Cl.
*H01M 10/623* (2014.01)
*H01M 10/653* (2014.01)
*H01M 10/6554* (2014.01)

(52) U.S. Cl.
CPC ..... *H01M 10/653* (2015.04); *H01M 10/6554* (2015.04); *H01M 2220/30* (2013.01)

(56) References Cited

U.S. PATENT DOCUMENTS

| | | | | |
|---|---|---|---|---|
| 2013/0192807 | A1* | 8/2013 | DeKeuster | H01M 10/625 165/173 |
| 2015/0049243 | A1* | 2/2015 | Samuels | G03B 17/55 348/374 |
| 2015/0188205 | A1* | 7/2015 | Polochak | H01M 10/655 429/82 |

FOREIGN PATENT DOCUMENTS

| | | |
|---|---|---|
| RU | 2394307 C1 | 7/2010 |
| WO | 2010044553 | 4/2010 |

OTHER PUBLICATIONS

International Preliminary Report on Patentability for App. No. PCT/US2019/042121, dated Jan. 28, 2021, 5 pages.

\* cited by examiner

APPARATUS FOR BATTERY COOLING CONSIDERING BATTERY EXPANSION

CROSS-REFERENCE TO RELATED APPLICATIONS

This application is a 371 of International Application No. PCT/US2019/042121 filed on Jul. 17, 2019, which claims priority to U.S. Provisional Application No. 62/699,909, filed on Jul. 18, 2018, the entire disclosures of which are hereby incorporated by reference.

TECHNICAL FIELD

This disclosure relates to battery cooling during fast charging.

BACKGROUND

Lithium-ion (Li-ion) battery fast charging is a new technology to expedite the charging process and reduce waiting time. Fast charging typically allows higher charging current into the battery, as well as it typically generates more heat in the interior portion of the battery. On the other hand, battery discharging using a higher discharge rate will also generate a certain amount heat. If the additional heat generated from the battery is not treated well, the battery temperature would be increased significantly. Increases in battery temperature typically leads to the termination of the charging process, discharging process, or both, if temperature exceeds a threshold of the battery.

Since lithium-ion batteries expand during operation, heatsinks are typically not used with lithium-ion batteries for cooling. In order to manage battery charging or discharging and avoid a dangerous overheating situation, an appropriate battery heat dissipating design is required.

SUMMARY

Disclosed herein are implementations of a cooling apparatus for use with a battery or battery pack. The battery may be a lithium-ion battery, and the battery pack may be two or more lithium-ion batteries. A cooling apparatus may include a heatsink. The heatsink may have a clearance portion configured to allow expansion of the lithium-ion battery. The cooling apparatus may include a metal plate coupled to the heatsink. The heatsink may be configured to contact the battery on at least three sides.

In some implementations, the metal plate may be a spring plate. The spring plate may include one or more spring arms. The one or more spring arms may be configured to exert a force against the battery such that the battery maintains maximum surface contact with at least three sides of the heatsink. In some implementations, the spring arm may be constructed of stainless steel. In some implementations, the spring arm may be constructed of copper. In some implementations, the cooling apparatus may include a thermally conductive elastomer. The thermally conductive elastomer may be configured to exert a force against the battery such that the battery maintains maximum surface contact with at least three sides of the heatsink. The thermally conductive elastomer may be configured to deform to accommodate the lithium-ion battery during expansion. In some implementations, the metal plate may be constructed of stainless steel. In some implementations, the heatsink may be constructed of aluminum.

In an aspect, an apparatus for cooling a battery may include a heatsink and a metal plate. The heatsink may be configured to absorb heat from the battery. The heatsink may be configured to contact the battery on at least three sides. The heatsink may include a clearance portion. The clearance portion may be configured to allow expansion of the battery. The metal plate may be coupled to the heatsink. The metal plate may include a spring arm.

In an aspect, an apparatus for cooling a battery may include a heatsink, an elastomer, and a metal plate. The elastomer may be a thermally conductive elastomer. The heatsink may be configured to absorb heat from the battery. The heatsink may contact the battery on at least three sides. The heatsink may include a flange portion configured to hold the battery. The flange portion may be configured to create an opening. The opening may allow expansion of the battery. The elastomer may include a base and a raised portion. The base may be coupled to the flange portion. The raised portion may be in contact with the battery. The metal plate may be coupled to the elastomer.

In an aspect, a device may be configured to power an image capture device. The device may include a battery, a heatsink, and an elastomer. The elastomer may be a thermally conductive elastomer. The heatsink may be coupled to the battery. The heatsink may include a flange portion. The flange portion may be configured to hold the battery. The elastomer may include a base and a raised portion. The base may be coupled to the flange portion. The raised portion may be in contact with the battery.

In one or more aspects, the spring arm may be configured to exert a force against the battery such that the battery maintains surface contact with at least three sides of the heatsink. In one or more aspects, the spring arm may be constructed of stainless steel or copper. In one or more aspects, the heatsink may be constructed of stainless steel or copper. In one or more aspects, the heatsink may be removably attached to the battery. In one or more aspects, the elastomer may be configured to exert a force against the battery such that the battery maintains surface contact with at least three sides of the heatsink. In one or more aspects, the raised portion of the elastomer may be flexible. In one or more aspects, the raised portion of the elastomer may be configured to allow expansion of the battery. In one or more aspects, the metal plate may be constructed of stainless steel. In one or more aspects, the heatsink may be constructed of aluminum. In one or more aspects, the elastomer may include a pocket portion. In one or more aspects, the pocket portion may be configured to deform to allow expansion of the battery. In one or more aspects, the pocket portion may include an inert gas.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIB. 5B is a perspective view of the battery cooling apparatus shown in FIG. 4 and FIG. 5A.

DETAILED DESCRIPTION

Figure 1:
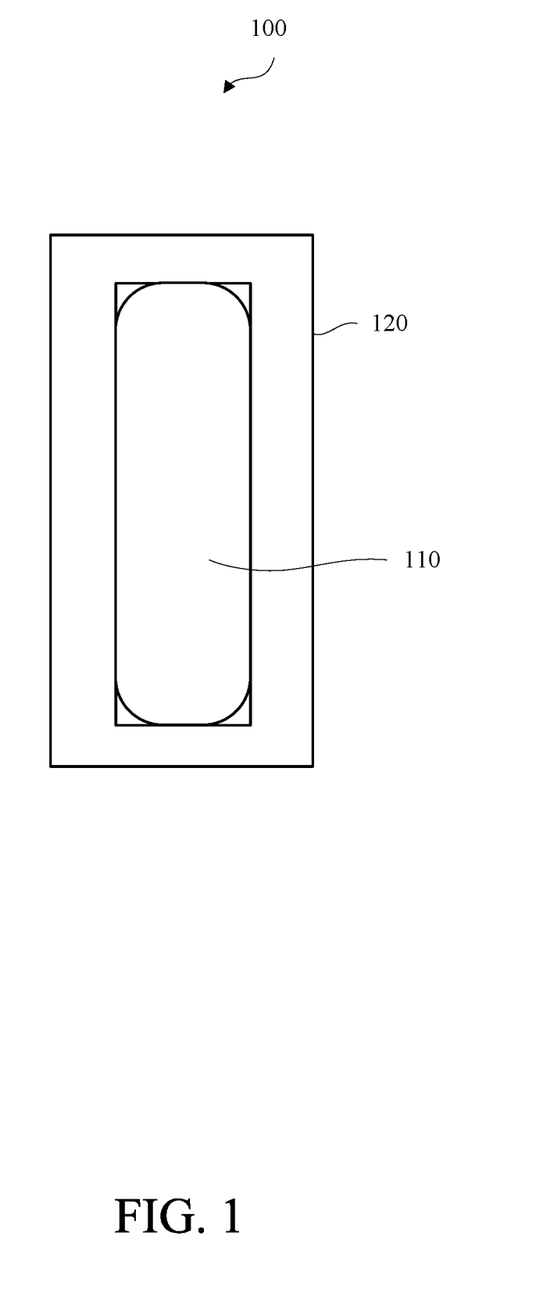
FIG. 1 is a diagram of an example of a typical battery pack in a heatsink configuration.

FIG. 1 is a diagram of an example of a typical configuration 100 for a battery pack 110 in a heatsink 120. The battery pack 110 may include one or more batteries. As shown in FIG. 1, the heatsink 120 is not configured to accommodate any expansion of the battery pack 110 during charging and discharging. A typical lithium-ion battery expands approximately 8% to 10%, therefore the heatsink would need to be designed to accommodate the expansion.

Figure 2A:
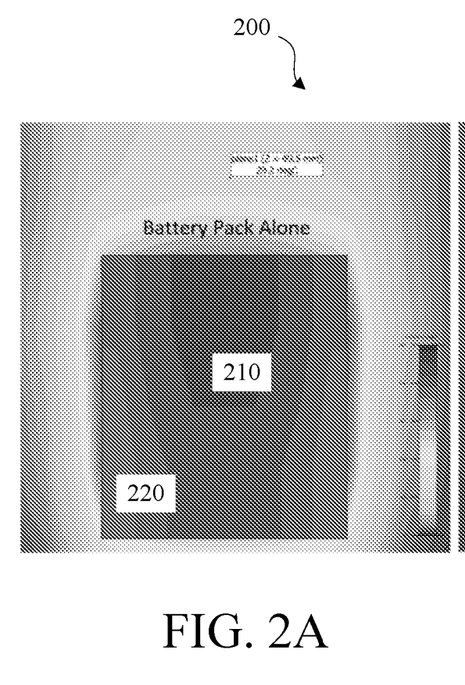
FIG. 2A is a diagram of an example of a heat map of a battery pack without a heatsink.
Figure 2B:
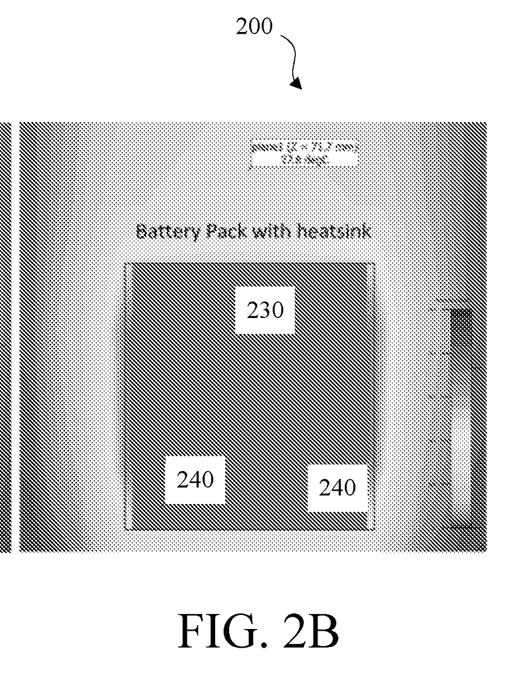
FIG. 2B is a diagram of an example of a heat map of a battery pack with a heatsink.

FIGS. 2A and 2B are diagrams of examples of heat maps 200 comparing a battery pack without a heatsink (FIG. 2A) to a battery pack with a heatsink (FIG. 2B). The darker shaded areas indicate a higher temperature, whereas the lighter shaded areas indicate a lower temperature. As shown FIG. 2A, the battery pack alone without a heatsink shows a temperature of about 33.8° C. near the center 210 of the battery pack where expansion occurs the most. The outer edges 220 of the battery pack alone without a heatsink shows a temperature of about 31.9° C. By way of comparison, as shown in FIG. 2B, the battery pack with a heatsink shows a temperature of about 31.8° C. near the center 230 of the battery pack where expansion occurs the most. The outer edges 240 of the battery pack with a heatsink shows a temperature of about 31.8° C. Accordingly, the battery pack with a heatsink shows a consistent temperature of about 31.8° C. across most of the surface of the battery pack.

FIGS. 2A and 2B illustrate the battery pack temperature improvements without system impact when the heatsink thickness is about 1 mm. The heatsink results in about a 2° C. reduction in battery pack temperature when compared with the battery alone. In reality, the battery pack will be installed into an electronic device while the system heat generated by other components would directly affect the result. It is expected that increased temperature reduction would occur when the system effect is taken into account as well as implementing a thicker heatsink design.

The expansion of lithium-ion batteries is another challenge which can be widely found in many applications such as mobile phones or laptops. There is no known single cause for a swollen battery, nevertheless, the problem is not avoidable. Accordingly, an additional space of about 8% to 10% of battery thickness dimension would be needed to allow battery expansion from a battery manufacturer. If there is inadequate spare space, the potential for battery explosion increases, which is dangerous to the end user.

Considering the battery expansion effect, some implementations include a clearance between the battery and a heat dissipating device for a fresh battery pack. The clearance would provide additional thermal impedance and further degrade heat transferring from the battery.

Figure 3:
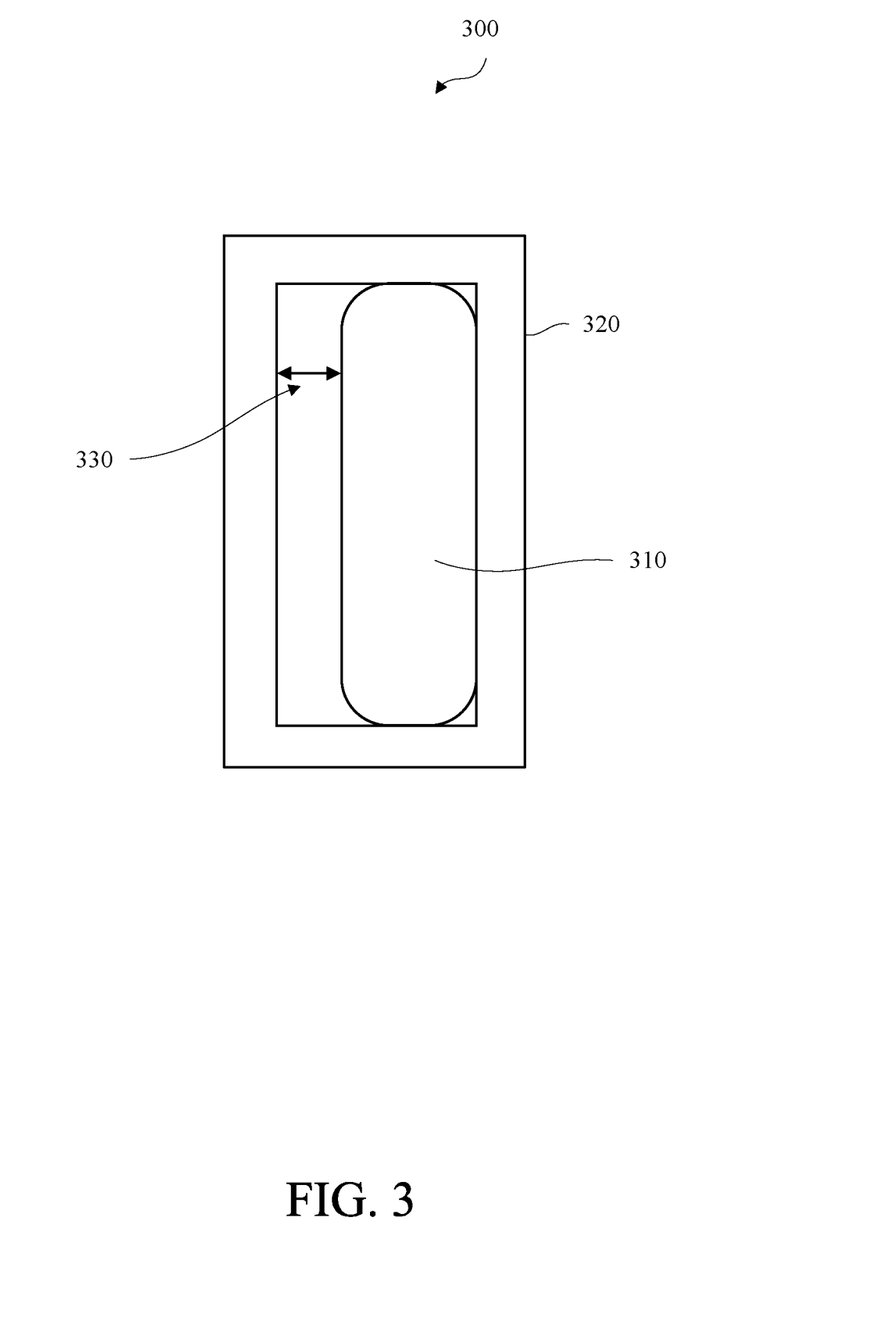
FIG. 3 is a diagram of an example of a battery cooling apparatus that is configured to accommodate battery pack expansion in accordance with embodiments of this disclosure.

FIG. 3 is a diagram of an example of a battery cooling apparatus 300 that is configured to accommodate battery pack expansion in accordance with embodiments of this disclosure. As shown in FIG. 3, a battery pack 310 may be configured with a heatsink 320. The battery pack 310 may be removably attached to the heatsink 320. In some embodiments, the battery pack 310 may be permanently attached to the heatsink 320, for example using an adhesive, glue, or any suitable means. The heatsink 320 may be configured to accommodate battery pack expansion. As shown in FIG. 3, the heatsink 320 is configured with a clearance 330 to allow expansion of the battery pack. The heatsink 320 may be comprised of any metal or metal alloy. For example, the heatsink 320 may be comprised of aluminum, copper, steel, stainless steel, or any combination thereof. The heatsink 320 may be an extruded heatsink or a stamped heatsink. One or more walls of the heatsink 320 may have a thickness that ranges from about 1.0 mm to about 3.0 mm. The heatsink 320 is configured such that it is in contact with one or more sides of the battery pack 310. As shown in FIG. 3, the heatsink is configured such that it is in contact with three sides of the battery pack 310 to maximize heat dissipation. In this example, the amount of clearance 330 may be to allow about 8% to 10% expansion of the battery in a thickness direction. For example, the clearance 330 may range from about 0.8 mm to about 1.0 mm. In this example, the surface of the battery pack 310 is in contact with the rigid body of the heatsink 320. Battery expansion will not occur where the battery pack 310 is in contact with the three surfaces of the heatsink 320. Instead, battery expansion may be encountered in the direction of the free surface (i.e., the clearance 330) without the constraint of the rigid heatsink body. In this example, the clearance 330 may cause the battery pack 310 to shift, and therefore negatively impact the heat dissipation when one or more sides of the battery pack 310 are not in contact with the heatsink 320.

Figure 4:
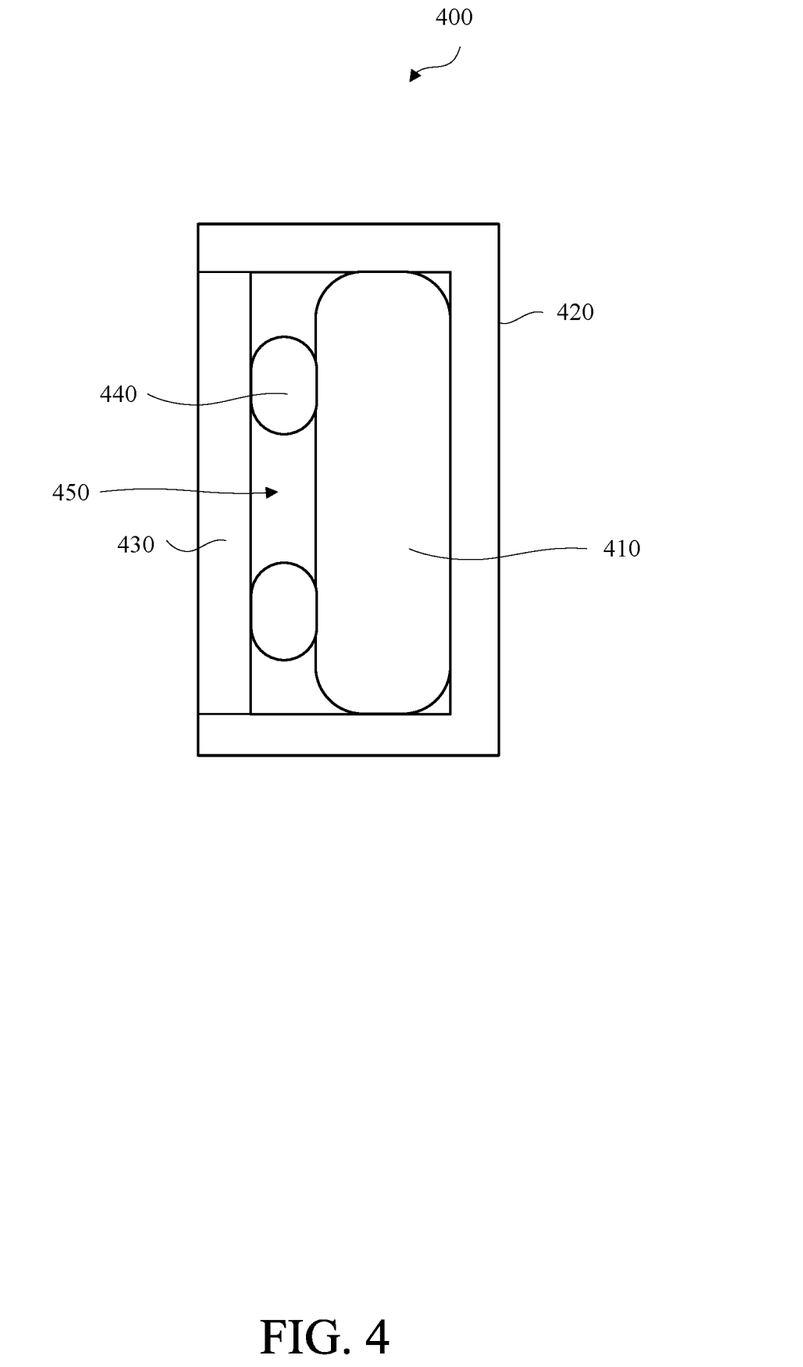
FIG. 4 is a diagram of another example of a battery cooling apparatus in accordance with embodiments of this disclosure.

FIG. 4 is a diagram of another example of a battery cooling apparatus 400 in accordance with embodiments of this disclosure. As shown in FIG. 4, a battery pack 410 may be configured with a heatsink 420. The battery pack 410 may be removably attached to the heatsink 420. In some embodiments, the battery pack 410 may be permanently attached to the heatsink 420, for example using an adhesive, glue, or any suitable means.

The heatsink 420 may be comprised of any metal or metal alloy. For example, the heatsink 420 may be comprised of aluminum, copper, steel, stainless steel, or any combination thereof. The heatsink 420 may be an extruded heatsink or a stamped heatsink. One or more walls of the heatsink 420 may have a thickness that ranges from about 1.0 mm to about 3.0 mm. The heatsink 420 may include a spring plate 430. The spring plate 430 may be comprised of the same material as the heatsink 420. In some embodiments, the spring plate 430 may be comprised of a material that is different from the material of the heatsink 420. As shown in FIG. 4, one or more spring arms 440 may be configured between the battery pack 410 and the heatsink 420. In this example, the spring plate 430 is shown with two spring arms, although any number of spring arms may be used. The spring arm 430 is used to stabilize the battery pack 410 to minimize the clearance impact on heat dissipation. In this example, the spring arms 440 have enough tension to stabilize the battery pack 410 to maximize the surface area of contact between the battery pack 410 and the heatsink 420 to cool the battery pack 410, yet allow the battery pack 410 to expand. For example, the spring arms 440 may have a tension of around 4.0 N. In this example, the surface of the battery pack 410 is in contact with the rigid body of the heatsink 420. Battery expansion will not occur where the battery pack 410 is in contact with one or more surfaces of the heatsink 420. Instead, battery expansion may be encountered in the direction of the free surface (i.e., the clearance 450) without the constraint of the rigid heatsink body. Although the example in FIG. 4 is shown configured with spring arms, it is understood that any type of spring may be used. For example, the spring may include a compression spring, a torsion spring, a constant force spring, or any combination thereof.

The spring plate 430 provides a controllable force which is lower than a maximum allowable force exerted on the battery pack 410 between the battery pack 410 and the heatsink 420. The spring plate 430 is configured to ensure that the battery pack 410 and the heatsink 420 have maximum contact and to prevent battery pack movement in the clearance space due to external shock, vibration, and drop events. The force of the spring arms 440 may be controlled in a variety of ways. For example, the material may be varied to control the force. The spring arms 440 may be constructed of any material, such as for example, stainless steel or copper. In another example, the length of the spring arms 440 may be adjusted to control the force. For example, the length of the spring arms 440 may range from about 8.0 mm to about 12.0 mm. In some examples, the length of the spring arms may be about 10.0 mm. In yet another example, the number of spring arms 440 may be adjusted to control the force. For example, four spring arms may be used instead of two spring arms.

Figure 5A:
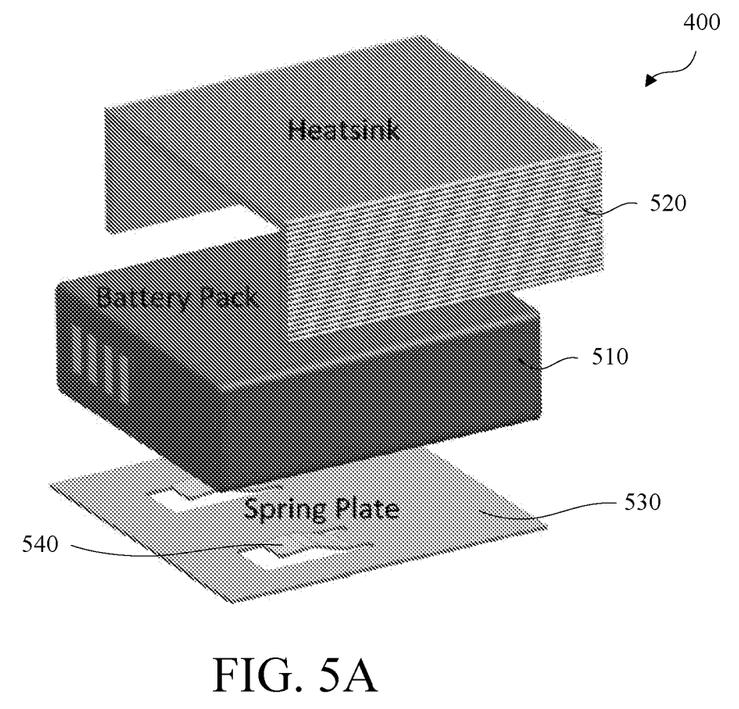
FIG. 5A is an exploded diagram of an example of the battery cooling apparatus of FIG. 4.

FIG. 5A is an exploded diagram of an example of the battery cooling apparatus 400 of FIG. 4. The battery cooling apparatus is configured to house one or more batteries, and is shown as a battery pack 510 in FIG. 5A. As shown in FIG. 5A, the battery cooling apparatus 400 includes a heatsink 520. The battery pack 510 may be removably attached to the heatsink 520. In some embodiments, the battery pack 510 may be permanently attached to the heatsink 520, for example via an adhesive, glue, or any suitable means. The heatsink 520 may be comprised of any metal or metal alloy. For example, the heatsink 520 may be comprised of aluminum, copper, steel, stainless steel, or any combination thereof. The heatsink 520 may be an extruded heatsink or a stamped heatsink. One or more walls of the heatsink 520 may have a thickness that ranges from about 1.0 mm to about 3.0 mm.

The battery cooling apparatus 400 may include a spring plate 530. One or more spring arms 540 may be configured between the battery pack 510 and the heatsink 520. In this example, the spring plate 510 is shown with two spring arms 540, although any number of spring arms may be used. The spring arm 540 is used to stabilize the battery to minimize the clearance impact on heat dissipation. In this example, the spring arms 540 have enough tension to stabilize the battery pack 510 to maximize the surface area of contact between the battery pack 510 and the heatsink 520 to cool the battery pack 510, yet allow the battery pack 510 to expand. For example, the spring arms 540 may have a tension of about 4.0 N. In this example, the surface of the battery pack 510 is in contact with the rigid body of the heatsink 520. Battery expansion will not occur where the battery pack 510 is in contact with these three surfaces. Instead, battery expansion may be encountered in the direction of the free surface without the constraint of the rigid heatsink body.

The spring plate 530 provides a controllable force which is lower than a maximum allowable force exerted on the battery pack between the battery pack 510 and heatsink 520. The spring plate 530 is configured to ensure that the battery pack 510 and the heatsink 520 have maximum contact and to prevent battery pack movement in the clearance space due to external shock, vibration and drop events. The force of the spring arms 540 may be controlled in a variety of ways. For example, the material may be varied to control the force. The spring arms 540 may be constructed of any material, such as for example, stainless steel or copper. In another example, the length of the spring arms 540 may be adjusted to control the force. For example, the length of the spring arms 540 may range from about 8.0 mm to about 12.0 mm. In some examples, the spring arms may have a length of about 10.0 mm. In yet another example, the number of spring arms 540 may be adjusted to control the force. For example, four spring arms may be used instead of two spring arms.

Figure 5B:
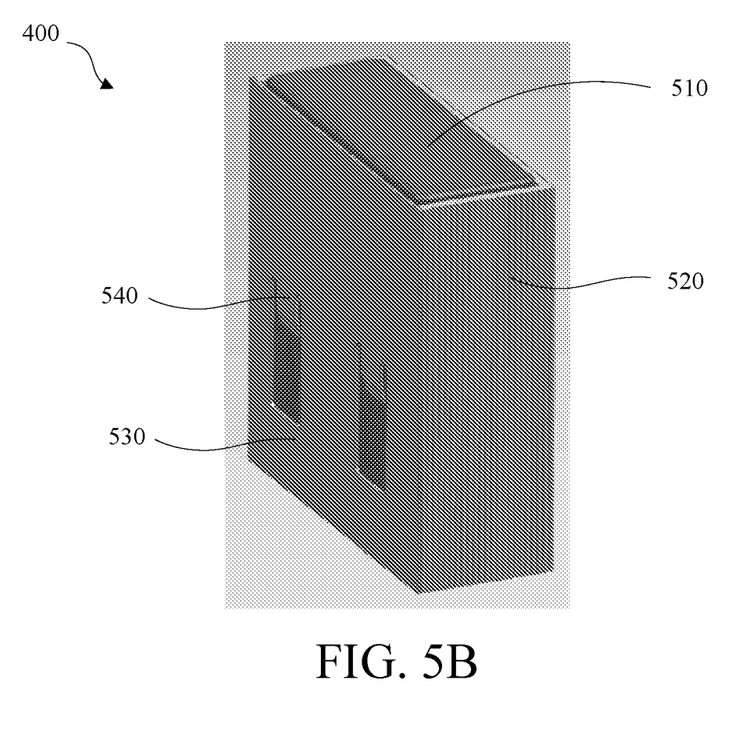

FIG. 5B is a perspective view of the battery cooling apparatus 400 shown in FIG. 4 and FIG. 5A. The battery cooling apparatus is configured to house one or more batteries, and is shown as a battery pack 510 in FIG. 5A. As shown in FIG. 5B, the battery cooling apparatus 400 includes a heatsink 520. The battery pack 510 may be removably attached to the heatsink 520. In some embodiments, the battery pack 510 may be permanently attached to the heatsink 520, for example via an adhesive, glue, or any suitable means. The heatsink 520 may be comprised of any metal or metal alloy. For example, the heatsink 520 may be comprised of aluminum, copper, steel, stainless steel, or any combination thereof. The heatsink 520 may be an extruded heatsink or a stamped heatsink. One or more walls of the heatsink 520 may have a thickness that ranges from about 1.0 mm to about 3.0 mm.

The battery cooling apparatus 400 may include a spring plate 530. One or more spring arms 540 may be configured between the battery pack 510 and the heatsink 520. In this example, the spring plate 510 is shown with two spring arms 540, although any number of spring arms may be used. The spring arm 540 is used to stabilize the battery to minimize the clearance impact on heat dissipation. In this example, the spring arms 540 have enough tension to stabilize the battery pack 510 to maximize the surface area of contact between the battery pack 510 and the heatsink 520 to cool the battery pack 510, yet allow the battery pack 510 to expand. In some examples, the tension of the spring arms 540 may be about 4.0 N. In this example, the surface of the battery pack 510 is in contact with the rigid body of the heatsink 520. Battery expansion will not occur where the battery pack 510 is in contact with these three surfaces. Instead, battery expansion may be encountered in the direction of the free surface without the constraint of the rigid heatsink body.

The spring plate 530 provides a controllable force which is lower than a maximum allowable force exerted on the battery pack between the battery pack 510 and heatsink 520. The spring plate 530 is configured to ensure that the battery pack 510 and the heatsink 520 have maximum contact and to prevent battery pack movement in the clearance space due to external shock, vibration and drop events. The force of the spring arms 540 may be controlled in a variety of ways. For example, the material may be varied to control the force. The spring arms 540 may be constructed of any material, such as for example, stainless steel or copper. In another example, the length of the spring arms 540 may be adjusted to control the force. For example, the length of the spring arms 540 may range from about 8.0 mm to about 12.0 mm. In some examples, the length of the spring arms 540 may be about 10 mm. In yet another example, the number of spring arms 540 may be adjusted to control the force. For example, four spring arms may be used instead of two spring arms.

Figure 6A:
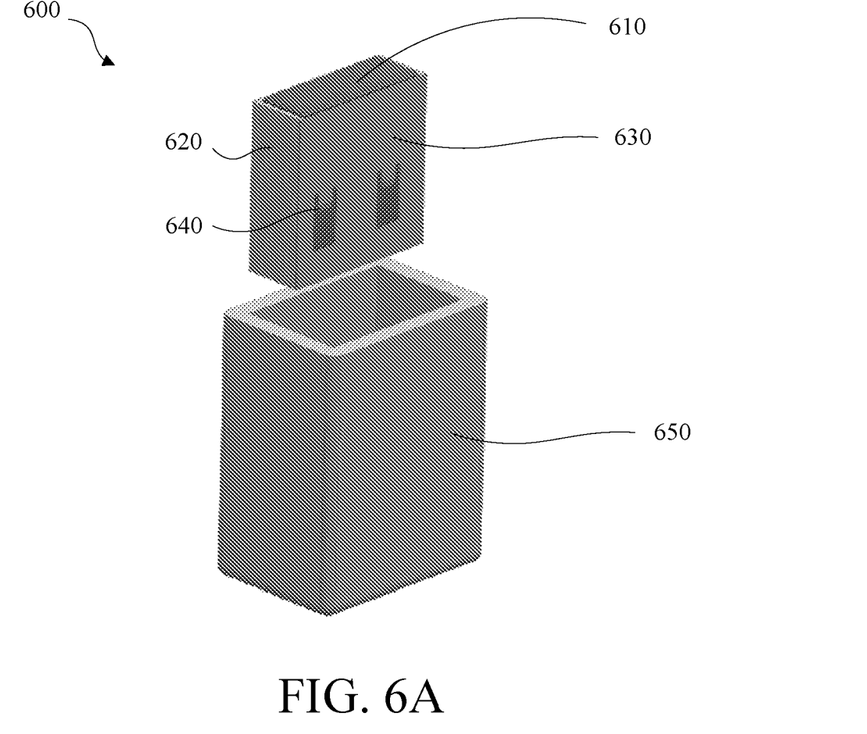
FIG. 6A is a diagram of an example of an apparatus application for a charger product.

FIG. 6A is a diagram of an example of a charging apparatus 600. The charging apparatus 600 may be implemented as a turnkey solution for any electronic product with a slide guide design. As shown in FIG. 6A, the charging apparatus 600 has an opening that is configured to removably hold one or more battery packs 610 that may each be configured with a heatsink 620. The battery pack 610 may be removably attached to the heatsink 620. In some embodiments, the battery pack 610 may be permanently attached to the heatsink 620, for example via an adhesive, glue, or any suitable means.

In this example, the heatsink 620 is configured with a spring plate 630. The heatsink 620 may be comprised of any metal or metal alloy. For example, the heatsink 620 may be comprised of aluminum, copper, steel, stainless steel, or any combination thereof. The heatsink 620 may be an extruded heatsink or a stamped heatsink. One or more walls of the heatsink 620 may have a thickness that ranges from about 1.0 mm to about 3.0 mm.

The spring plate 630 may be comprised of the same material as the heatsink 620. In some embodiments, the spring plate 630 may be comprised of a material that is different from the material of the heatsink 620. As shown in FIG. 6A, one or more spring arms 640 may be configured between the battery pack 610 and the heatsink 620. In this example, the spring plate 630 is shown with two spring arms, although any number of spring arms may be used. The spring arm 630 is used to stabilize the battery pack 610 to minimize the clearance impact on heat dissipation. In this example, the spring arms 640 have enough tension to stabilize the battery pack 610 to maximize the surface area of contact between the battery pack 610 and the heatsink 620 to cool the battery pack 610, yet allow the battery pack 610 to expand. For example, the spring arms 640 may have a tension of about 4.0 N. In this example, the surface of the battery pack 610 is in contact with the rigid body of the heatsink 620. Battery expansion will not occur where the battery pack 610 is in contact with one or more surfaces of the heatsink 620. Instead, battery expansion may be encountered in the direction of the free surface without the constraint of the rigid heatsink body. Although the example in FIG. 6A is shown configured with spring arms, it is understood that any type of spring may be used. For example, the spring may include a compression spring, a torsion spring, a constant force spring, or any combination thereof.

The spring plate 630 provides a controllable force which is lower than a maximum allowable force exerted on the battery pack 610 between the battery pack 610 and the heatsink 620. The spring plate 630 is configured to ensure that the battery pack 610 and the heatsink 620 have maximum contact and to prevent battery pack movement in the clearance space due to external shock, vibration, and drop events. The force of the spring arms 640 may be controlled in a variety of ways. For example, the material may be varied to control the force. The spring arms 640 may be constructed of any material, such as for example, stainless steel or copper. In another example, the length of the spring arms 640 may be adjusted to control the force. For example, the length of the spring arms 640 may range from about 8.0 mm to about 12.0 mm. In some examples, the length of the spring arms 640 may be about 10.0 mm. In yet another example, the number of spring arms 640 may be adjusted to control the force. For example, four spring arms may be used instead of two spring arms.

Figure 6B:
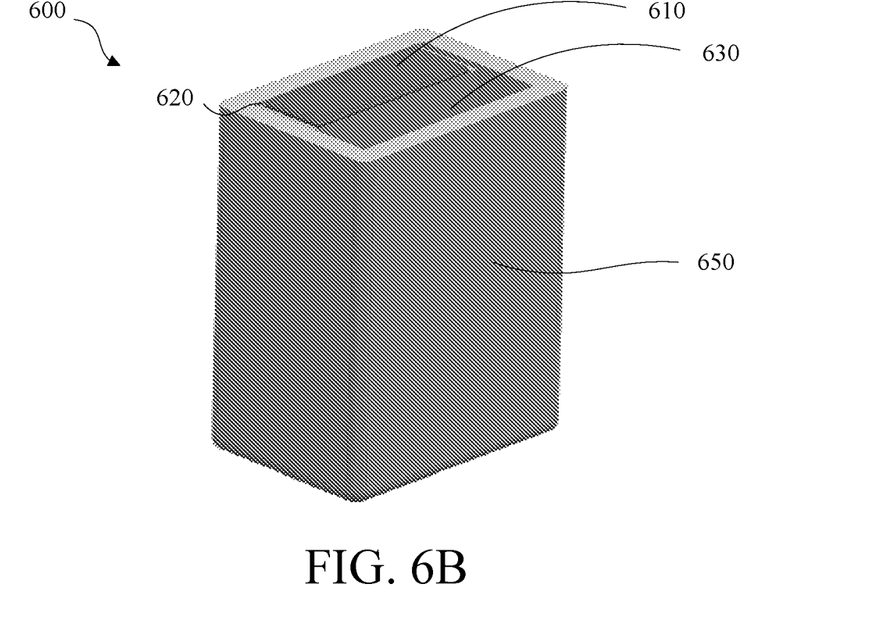
FIG. 6B is a diagram of another example of an apparatus application for a charger product.

FIG. 6B is a diagram of another example of an charging apparatus 600. FIG. 6B shows an example where the battery pack 610 is inserted into the charging apparatus 600. As shown in FIG. 6B, the charging apparatus 600 has an opening that is configured to removably hold one or more battery packs 610 that each may be configured with a heatsink 620. The battery pack 610 may be removably attached to the heatsink 620. In some embodiments, the battery pack 610 may be permanently attached to the heatsink 620, for example via an adhesive, glue, or any suitable means.

In this example, the heatsink 620 is configured with a spring plate 630. The heatsink 620 may be comprised of any metal or metal alloy. For example, the heatsink 620 may be comprised of aluminum, copper, steel, stainless steel, or any combination thereof. The heatsink 620 may be an extruded heatsink or a stamped heatsink. One or more walls of the heatsink 620 may have a thickness that ranges from about 1.0 mm to about 3.0 mm.

The spring plate 630 may be comprised of the same material as the heatsink 620. In some embodiments, the spring plate 630 may be comprised of a material that is different from the material of the heatsink 620. One or more spring arms (not shown) may be configured between the battery pack 610 and the heatsink 620. The one or more spring arms may be used to stabilize the battery pack 610 to minimize the clearance impact on heat dissipation. The spring arms may be configured with enough tension to stabilize the battery pack 610 to maximize the surface area of contact between the battery pack 610 and the heatsink 620 to cool the battery pack 610, yet allow the battery pack 610 to expand during charging. For example, the spring arms may have a tension of about 4.0 N. In this example, the surface of the battery pack 610 is in contact with the rigid body of the heatsink 620. Battery expansion will not occur where the battery pack 610 is in contact with one or more surfaces of the heatsink 620. Instead, battery expansion may be encountered in the direction of the free surface without the constraint of the rigid heatsink body. It is understood that any type of spring may be used. For example, the spring may include a compression spring, a torsion spring, a constant force spring, or any combination thereof.

The spring plate 630 provides a controllable force which is lower than a maximum allowable force exerted on the battery pack 610 between the battery pack 610 and the heatsink 620. The spring plate 630 is configured to ensure that the battery pack 610 and the heatsink 620 have maximum contact and to prevent battery pack movement in the clearance space due to external shock, vibration, and drop events. The force of the spring arms 640 may be controlled in a variety of ways. For example, the material may be varied to control the force. The spring arms may be constructed of any material, such as for example, stainless steel or copper. In another example, the length of the spring arms may be adjusted to control the force. For example, the length of the spring arms may range from about 8.0 mm to about 12.0 mm. In some examples, the length of the spring arms may be about 10.0 mm. In yet another example, the number of spring arms may be adjusted to control the force. For example, four spring arms may be used instead of two spring arms.

Figure 7A:
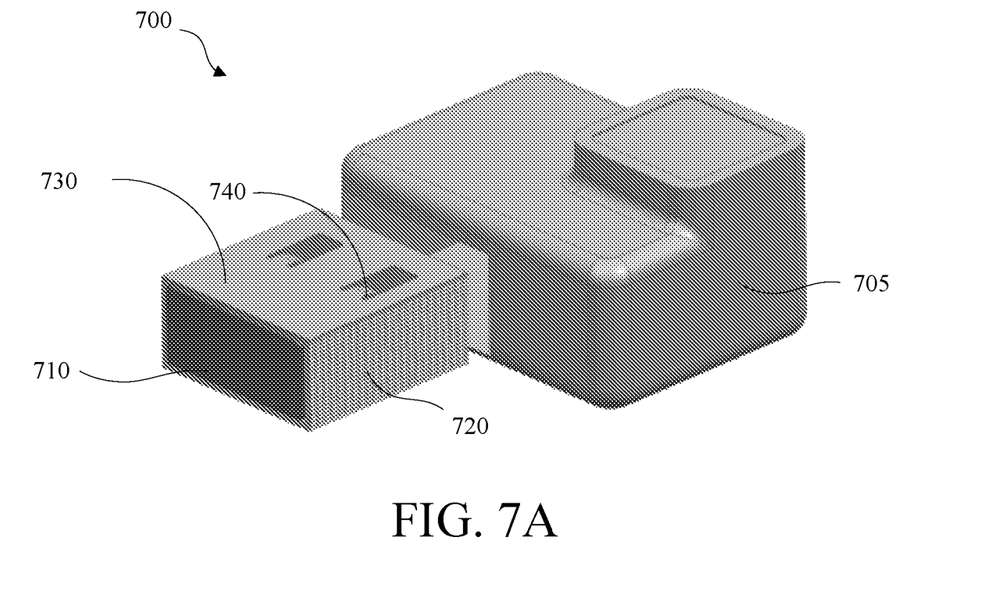
FIG. 7A is a diagram of an example of a battery cooling apparatus for an image capture device.

FIG. 7A is a diagram of an example of a battery cooling apparatus 700 for an image capture device 705. The battery cooling apparatus 700 may be implemented as a turnkey solution for any electronic product with a slide guide design. As shown in FIG. 7A, the image capture device 705 has an opening that is configured to removably hold a battery pack 710 that is configured with a heatsink 720. The opening may be referred to as a battery compartment. The battery pack 710 may be removably attached to the heatsink 720. In some embodiments, the battery pack 710 may be permanently attached to the heatsink 720, for example via an adhesive, glue, or any suitable means.

In this example, the heatsink 720 is configured with a spring plate 730. The heatsink 720 may be comprised of any metal or metal alloy. For example, the heatsink 720 may be comprised of aluminum, copper, steel, stainless steel, or any combination thereof. The heatsink 720 may be an extruded heatsink or a stamped heatsink. One or more walls of the heatsink 720 may have a thickness that ranges from about 1.0 mm to about 3.0 mm.

The spring plate 730 may be comprised of the same material as the heatsink 720. In some embodiments, the spring plate 730 may be comprised of a material that is different from the material of the heatsink 720. As shown in FIG. 7A, one or more spring arms 740 may be configured between the battery pack 710 and the heatsink 720. In this example, the spring plate 730 is shown with two spring arms, although any number of spring arms may be used. The spring arm 730 is used to stabilize the battery pack 710 to minimize the clearance impact on heat dissipation. In this example, the spring arms 740 have enough tension to stabilize the battery pack 710 to maximize the surface area of contact between the battery pack 710 and the heatsink 720 to cool the battery pack 710, yet allow the battery pack 710 to expand. For example, the spring arms 740 may have a tension of about 4.0 N. In this example, the surface of the battery pack 710 is in contact with the rigid body of the heatsink 720. Battery expansion will not occur where the battery pack 710 is in contact with one or more surfaces of the heatsink 720. Instead, battery expansion may be encountered in the direction of the free surface without the constraint of the rigid heatsink body. Although the example in FIG. 7A is shown configured with spring arms, it is understood that any type of spring may be used. For example, the spring may include a compression spring, a torsion spring, a constant force spring, or any combination thereof.

The spring plate 730 provides a controllable force which is lower than a maximum allowable force exerted on the battery pack 710 between the battery pack 710 and the heatsink 720. The spring plate 730 is configured to ensure that the battery pack 710 and the heatsink 720 have maximum contact and to prevent battery pack movement in the clearance space due to external shock, vibration, and drop events. The force of the spring arms 740 may be controlled in a variety of ways. For example, the material may be varied to control the force. The spring arms 740 may be constructed of any material, such as, for example, stainless steel or copper. In another example, the length of the spring arms 740 may be adjusted to control the force. For example, the length of the spring arms 740 may range from about 8.0 mm to about 12.0 mm. In some examples, the length of the spring arms 740 may be about 10.0 mm. In yet another example, the number of spring arms 740 may be adjusted to control the force. For example, four spring arms may be used instead of two spring arms.

Figure 7B:
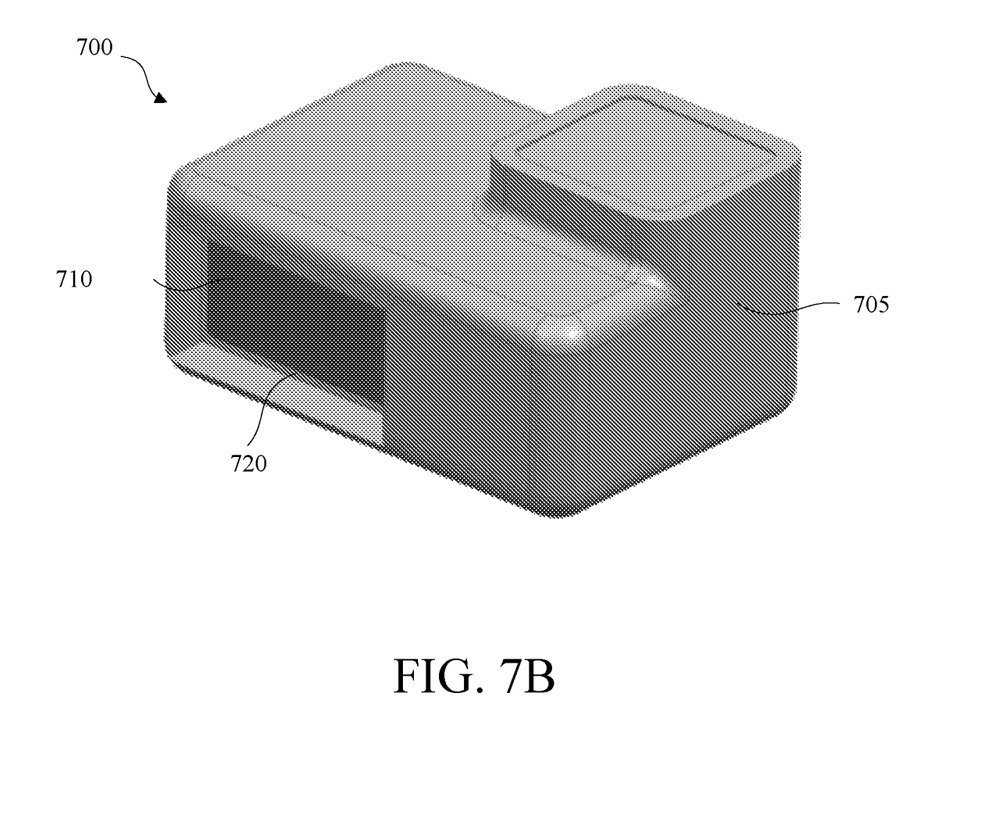
FIG. 7B is a diagram of the battery cooling apparatus of FIG. 7A inserted in an image capture device.

FIG. 7B is a diagram of the battery cooling apparatus 700 of FIG. 7A inserted into the image capture device 705. As shown in FIG. 7B, the image capture device 705 has an opening that is configured to removably hold a battery pack 710 that is configured with a heatsink 720. In this example, the heatsink 720 is configured with a spring plate as described above.

Figure 8:
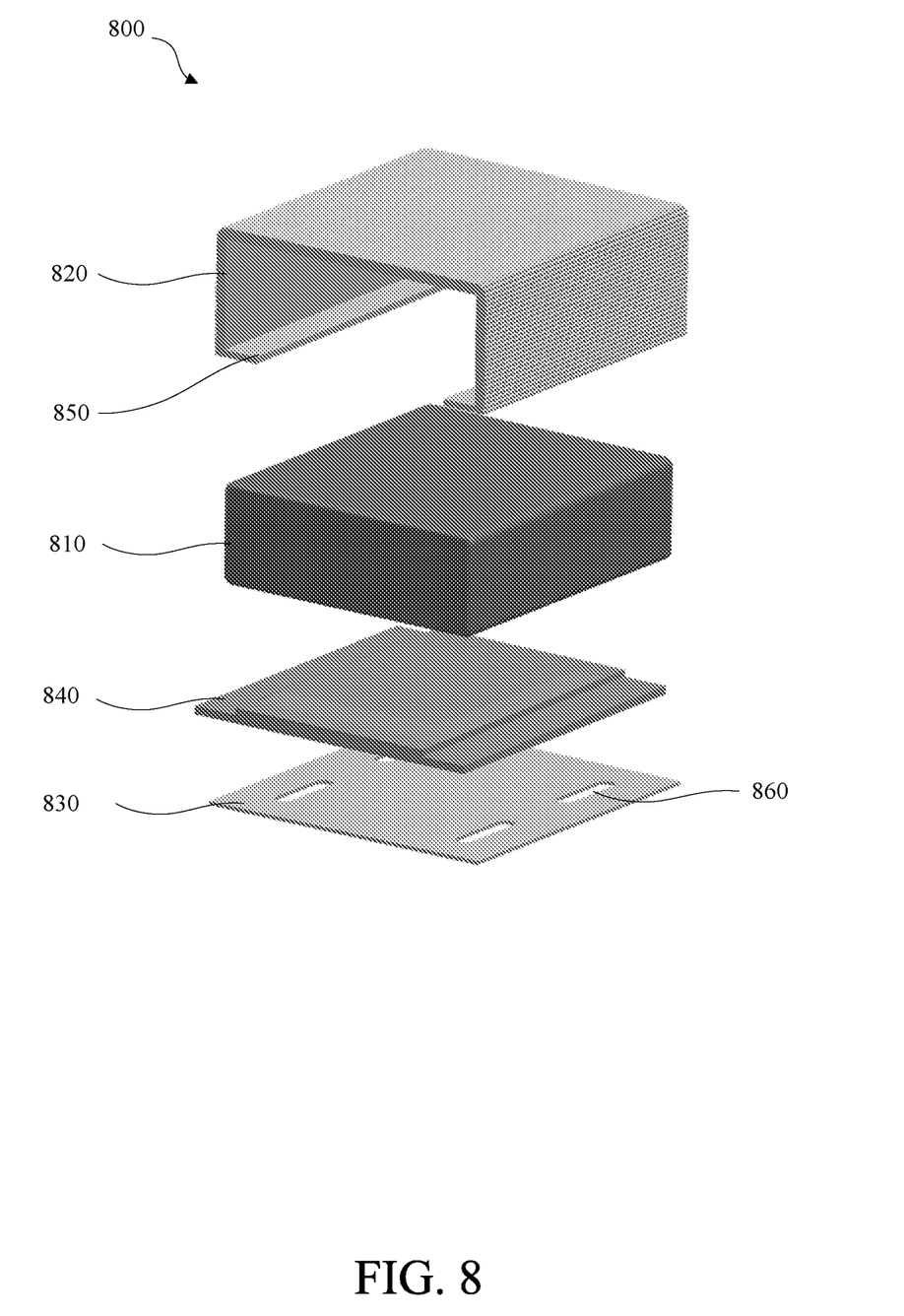
FIG. 8 is an exploded diagram of an example of another battery cooling apparatus.

FIG. 8 is an exploded diagram of an example of another battery cooling apparatus 800. As shown in FIG. 8, the battery cooling apparatus 800 includes a battery pack 810, a heatsink 820, a metal sheet 830, and a thermally conductive elastomer 840. In this example, the heatsink 820 may be constructed of aluminum, copper, or any suitable material. One or more walls of the heatsink may have a thickness that ranges from about 1.0 mm to about 3.0 mm. The metal sheet 830 may also be referred to as a metal plate. As shown in FIG. 8, the heatsink 820 may include a flange portion 850. The flange portion 850 is configured to secure the battery pack 820 such that the battery pack maintains contact with the heatsink 820. The opening created by the flange portion 850 allows for battery expansion. In some embodiments, the flange portion 850 may be in contact with a portion of the thermally conducting elastomer 840.

The thermally conductive elastomer 840 is flexible so as to allow the battery to expand in the thickness direction. The thermally conductive elastomer 840 is configured to maintain maximum battery contact with the heatsink 820 to ensure battery cooling during expansion. The thermally conductive elastomer 840 may be, for example, a Coolpoly elastomer that has a thermal conductivity that is 5 to 75 times the value of a conventional elastomer. The thermally conductive elastomer 840 may have a thickness that ranges from about 1.0 mm to about 3.0 mm. The metal sheet 830 may be made of any suitable material, for example stainless steel (i.e., SUS 304). For example, SUS 304 may be used to construct the metal sheet 830 to maintain the flexibility for battery swelling when deformation of the thermally conductive elastomer 840 meets or exceeds a threshold. The metal sheet 830 may have one or more cutout portions 860. The one or more cutout portions 860 may be configured to secure the thermally conductive elastomer 840.

Figure 9A:
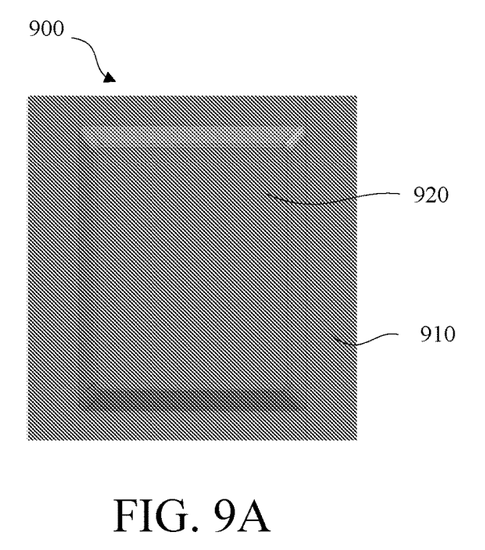
FIG. 9A is a top view of a thermally conductive elastomer for use with a heatsink configuration to accommodate battery pack expansion.

FIG. 9A is a top view of a thermally conductive elastomer 900 for use with a heatsink configuration to accommodate battery pack expansion. The thermally conductive elastomer 900 may be implemented in the battery cooling apparatus 800 of FIG. 8. The thermally conductive elastomer 900 is flexible so as to allow the battery to expand in the thickness direction. The thermally conductive elastomer 900 is configured to maintain maximum battery contact with a heatsink to ensure battery cooling during expansion. The thermally conductive elastomer 900 may be, for example, a Coolpoly elastomer that has a thermal conductivity that is 5 to 75 times the value of a conventional elastomer. The thermally conductive elastomer 900 may have a thickness that ranges from about 1.0 mm to about 3.0 mm.

As shown in FIG. 9A, the thermally conductive elastomer 900 includes a base 910 and a raised portion 920. The base 910 may be configured to be in contact with the flange portion 850 of the heatsink 820 shown in FIG. 8. The flange portion 850 may be removably attached to the base 910. In some embodiments, the flange portion 850 may be adhered to the base 910. The surface area of the base 910 may be the same or substantially similar to the surface area of the flange portion 850 that is in contact with the base 910. The area of the raised portion 920 may be the same or substantially similar to the area created by the flange portion 850 as shown in FIG. 8. In some embodiments, the base 910 may not be in contact with the battery. The raised portion 920 is configured such that it is in contact with the battery. The raised portion 920 may be flexible so as to allow the battery to expand in the thickness direction. The raised portion 920 may be of any shape or size, and in some embodiments may include one or more ridges to enhance heat dissipation and battery expansion.

Figure 9B:
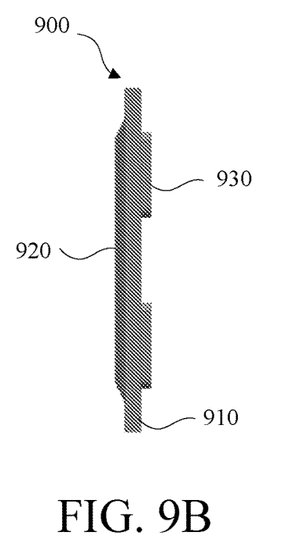
FIG. 9B is a side view of the thermally conductive elastomer of FIG. 9A.

FIG. 9B is a side view of the thermally conductive elastomer 900 of FIG. 9A. As shown in FIG. 9B, the thermally conductive elastomer 900 includes a base 910, a raised portion 920, and one or more protrusions 930. The thermally conductive elastomer 900 may be constructed of a single molded piece. In some embodiments, the thermally conductive elastomer 900 may be constructed of multiple pieces adhered together.

The base 910 may be configured to be in contact with the flange portion 850 of the heatsink 820 shown in FIG. 8. The flange portion 850 may be removably attached to the base 910. In some embodiments, the flange portion 850 may be adhered to the base 910. The surface area of the base 910 may be the same or substantially similar to the surface area of the flange portion 850 that is in contact with the base 910. The area of the raised portion 920 may be the same or substantially similar to the area created by the flange portion 850 as shown in FIG. 8. In some embodiments, the base 910 may not be in contact with the battery. The raised portion 920 is configured such that it is in contact with the battery. The raised portion 920 may be flexible so as to allow the battery to expand in the thickness direction. The raised portion 920 may be of any shape or size, and in some embodiments may include one or more ridges to enhance heat dissipation and battery expansion. The one or more protrusions 930 may be used to attach the thermally conductive elastomer 900 to the metal sheet 830 of FIG. 8 via the cutout portions 860. The size and shape of the one or more protrusions 930 may be the same or substantially similar to the size and shape of the cutout portions 860. The one or more protrusions 930 may be attached to the cutout portions 860 using friction or adhesive.

Figure 9C:
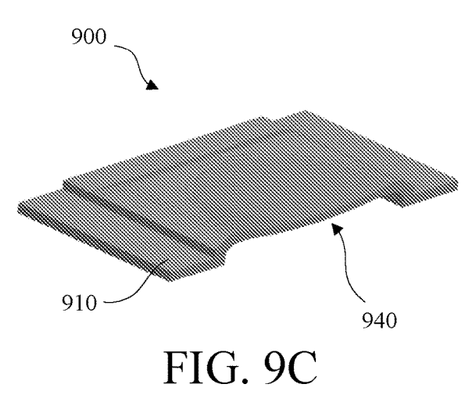
FIG. 9C is a perspective cross-sectional view of the thermally conductive elastomer of FIG. 9A and FIG. 9B.

FIG. 9C is a perspective cross-sectional view of the thermally conductive elastomer 900 of FIG. 9A and FIG. 9B. As shown in FIG. 9C, the thermally conductive elastomer 900 includes a base 910, a raised portion 920, and a pocket portion 940. The thermally conductive elastomer 900 may be constructed of a single molded piece. In some embodiments, the thermally conductive elastomer 900 may be constructed of multiple pieces adhered together.

The base 910 may be configured to be in contact with the flange portion 850 of the heatsink 820 shown in FIG. 8. The flange portion 850 may be removably attached to the base 910. In some embodiments, the flange portion 850 may be adhered to the base 910. The surface area of the base 910 may be the same or substantially similar to the surface area of the flange portion 850 that is in contact with the base 910. The area of the raised portion 920 may be the same or substantially similar to the area created by the flange portion 850 as shown in FIG. 8. In some embodiments, the base 910 may not be in contact with the battery. The raised portion 920 is configured such that it is in contact with the battery. The raised portion 920 may be flexible so as to allow the battery to expand in the thickness direction. The raised portion 920 may be of any shape or size, and in some embodiments may include one or more ridges to enhance heat dissipation and battery expansion. The pocket portion 940 may contain an inert gas, such as air. In some embodiments, the pocket portion 940 may contain a liquid, a gel, a foam, or any suitable compressible material. The pocket portion 940 is configured to allow the battery to expand in the thickness direction.

Figure 9D:
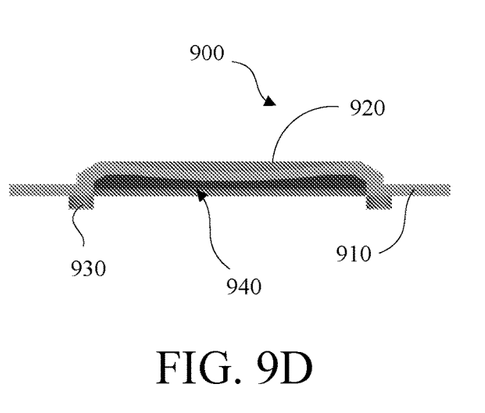
FIG. 9D is a cross-sectional view of the thermally conductive elastomer of FIG. 9A, FIG. 9B, and FIG. 9C.

FIG. 9D is a cross-sectional view of the thermally conductive elastomer 900 of FIG. 9A, FIG. 9B, and FIG. 9C. As shown in FIG. 9D, the thermally conductive elastomer 900 includes a base 910, a raised portion 920, one or more protrusions 930, and a pocket portion. The thermally conductive elastomer 900 may be constructed of a single molded piece. In some embodiments, the thermally conductive elastomer 900 may be constructed of multiple pieces adhered together.

The base 910 may be configured to be in contact with the flange portion 850 of the heatsink 820 shown in FIG. 8. The flange portion 850 may be removably attached to the base 910. In some embodiments, the flange portion 850 may be adhered to the base 910. The surface area of the base 910 may be the same or substantially similar to the surface area of the flange portion 850 that is in contact with the base 910. The area of the raised portion 920 may be the same or substantially similar to the area created by the flange portion 850 as shown in FIG. 8. In some embodiments, the base 910 may not be in contact with the battery. The raised portion 920 is configured such that it is in contact with the battery. The raised portion 920 may be flexible so as to allow the battery to expand in the thickness direction. The raised portion 920 may be of any shape or size, and in some embodiments may include one or more ridges to enhance heat dissipation and battery expansion. The one or more protrusions 930 may be used to attach the thermally conductive elastomer 900 to the metal sheet 830 of FIG. 8 via the cutout portions 860. The size and shape of the one or more protrusions 930 may be the same or substantially similar to the size and shape of the cutout portions 860. The one or more protrusions 930 may be attached to the cutout portions 860 using friction or adhesive. The pocket portion 940 may contain an inert gas, such as air. In some embodiments, the pocket portion 940 may contain a liquid, a gel, a foam, or any suitable compressible material. The pocket portion 940 is configured to allow the battery to expand in the thickness direction.

Figure 10:
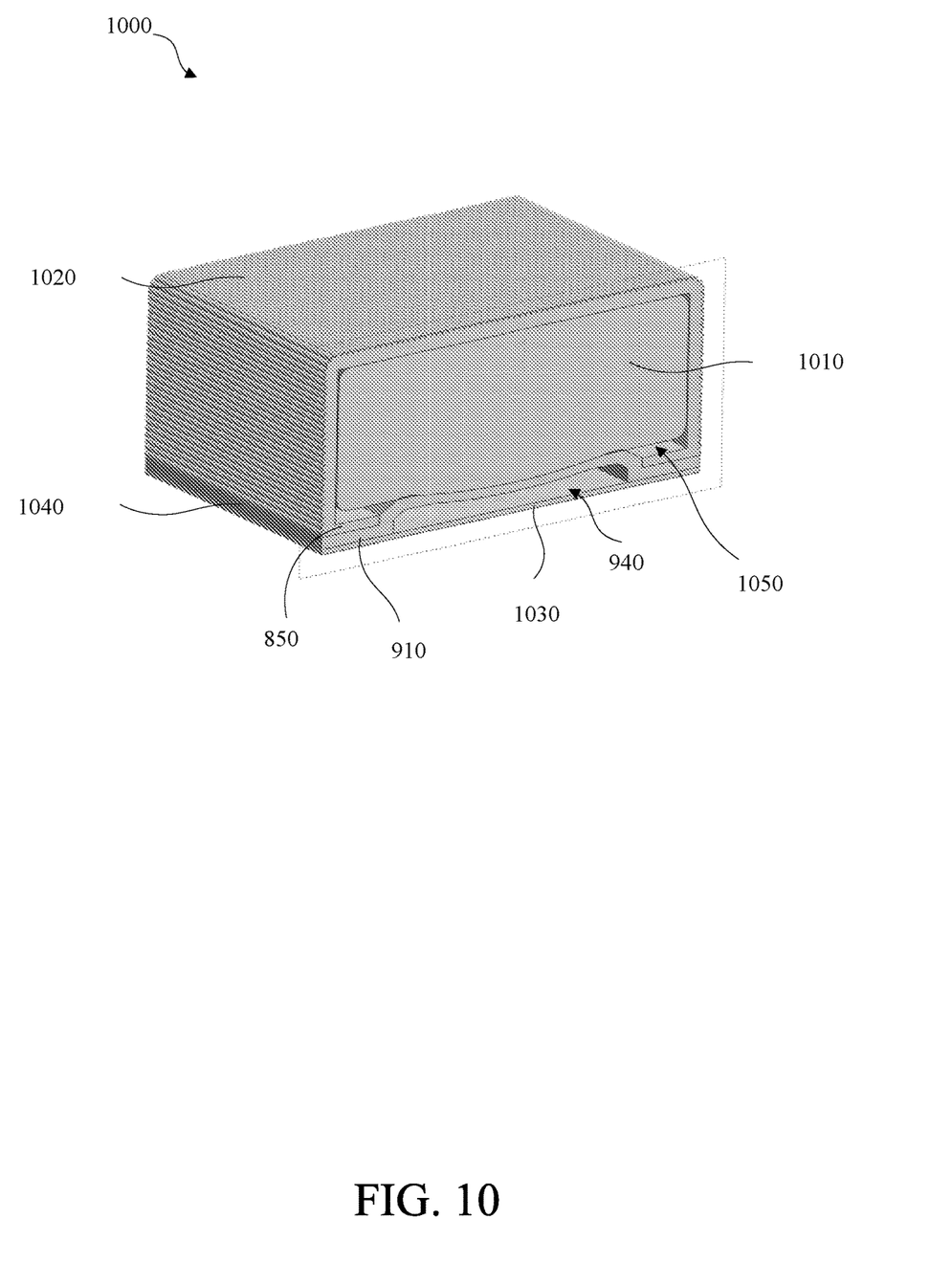
FIG. 10 is a perspective cross-sectional view of the battery cooling apparatus of FIG. 8.

FIG. 10 is a perspective cross-sectional view of a battery pack in a heatsink configuration. As shown in FIG. 10, the apparatus includes a battery pack 1010, a heatsink 1020, a metal sheet 1030, and a thermally conductive elastomer 1040. Some embodiments may be implemented without the metal sheet 1030. In this example, the heatsink 1020 may be constructed of aluminum, copper, or any suitable material. The thermally conductive elastomer 1040 is flexible so as to allow the battery to expand in the thickness direction. The thermally conductive elastomer 1040 is configured to maintain maximum battery contact with the heatsink 1020 to ensure battery cooling during expansion. The thermally conductive elastomer 1040 may be, for example, a Coolpoly elastomer that has a thermal conductivity that is 5 to 75 times the value of a conventional elastomer. The metal sheet 1030 may be made of any suitable material, for example stainless steel (i.e., SUS 304). For example, SUS 304 may be used to construct the metal sheet 1030 to maintain the flexibility for battery swelling when deformation of the elastomer is at or above a threshold. In this example, the battery pack 1010 is in an expanded state and is deforming the thermally conductive elastomer 1040.

The base 910 of the thermally conductive elastomer 1040 may be configured to be in contact with the flange portion 850 of the heatsink 1020. The flange portion 850 may be removably attached to the base 910. In some embodiments, the flange portion 850 may be adhered to the base 910. The surface area of the base 910 may be the same or substantially similar to the surface area of the flange portion 850 that is in contact with the base 910. The area of the raised portion 920 of the thermally conductive elastomer 1040 may be the same or substantially similar to the area created by the flange portion 850. In some embodiments, the base 910 may not be in contact with the battery. The raised portion 920 is configured such that it is in contact with the battery. The raised portion 920 may be flexible so as to allow the battery to expand in the thickness direction. The raised portion 920 may be of any shape or size, and in some embodiments may include one or more ridges to enhance heat dissipation and battery expansion. The pocket portion 940 of the thermally conductive elastomer 1040 may contain an inert gas, such as air. In some embodiments, the pocket portion 940 may contain a liquid, a gel, a foam, or any suitable compressible material. The pocket portion 940 is configured to allow the battery to expand in the thickness direction. In some embodiments, the battery cooling apparatus 1000 may include an opening 1050 between the battery pack 1010 and the flange portion 850 of the heatsink 1020. The opening 1050 may provide airflow to enhance cooling of the battery pack 1010 during expansion.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for cooling a battery, the apparatus comprising:
a heatsink configured to absorb heat from the battery and contact the battery on at least three sides, the heatsink comprising a flange portion configured to hold the battery, wherein the flange portion creates an opening configured to allow expansion of the battery in a thickness direction upon heating of the battery;
a thermally conductive elastomer comprising a base and a raised portion, wherein the base is in contact with the flange portion and the raised portion is configured to contact with the battery; and
a metal plate coupled to the thermally conductive elastomer.

2. The apparatus of claim 1, wherein the thermally conductive elastomer is configured to exert a force against the battery such that the battery maintains surface contact with at least three sides of the heatsink.

3. The apparatus of claim 2, wherein the raised portion of the thermally conductive elastomer is flexible and configured to allow expansion of the battery in the thickness direction.

4. The apparatus of claim 1, wherein the thermally conductive elastomer further comprises a pocket portion.

5. The apparatus of claim 4, wherein the pocket portion is configured to deform to allow expansion of the battery in the thickness direction.

6. The apparatus of claim 4, wherein the pocket portion contains an inert gas.

7. The apparatus of claim 4, wherein the pocket portion contains a compressible material.

8. The apparatus of claim 7, wherein the compressible material is a liquid, a gel, or a foam material.

9. An apparatus for cooling a battery, comprising:
a heatsink configured to contact at least three sides of the battery and to dissipate heat from the battery, the heatsink comprising a flange portion that is configured to define a clearance on a free side of the battery, wherein the clearance is configured to allow the battery to expand;
a thermally conductive elastomer configured to exert a force against the battery such that the heatsink maintains contact with the at least three sides of the battery, the thermally conductive elastomer comprising:
a raised portion that is disposed at least partially within the clearance and is configured to contact the battery, and
a base contacting the flange portion of the heatsink; and
a plate contacting the base of the thermally conductive elastomer.

10. The apparatus of claim 9, wherein the raised portion is flexible and configured to deform to allow the battery to expand in a thickness direction.

11. The apparatus of claim 10, wherein the heatsink is rigid and the plate is configured to maintain flexibility of the apparatus when deformation of the thermally conductive elastomer meets or exceeds a threshold.

12. The apparatus of claim 9, wherein the base of the thermally conductive elastomer is disposed outside of the clearance and is configured to not be in contact with the battery.

13. The apparatus of claim 12, wherein a surface area of the base of the thermally conductive elastomer is the same as a surface area of the flange portion of the heatsink that is in contact with the base.

14. The apparatus of claim 9, wherein the flange portion of the heatsink is configured define an opening between the flange portion and the battery, and the opening is configured to allow airflow therethrough.

15. The apparatus of claim 9, wherein the thermally conductive elastomer further comprises a pocket portion between the plate and the raised portion, wherein the pocket portion is configured to deform to allow the expansion of the battery.

16. An apparatus configured to cool a battery, comprising:
a heatsink configured to contact sides of the battery and absorb heat from the battery, the heatsink including a flange portion that creates an opening configured to allow expansion of the battery upon heating of the battery; and
a thermally conductive elastomer configured to exert a force against the battery such that the heatsink maintains contact with the sides of the battery, the thermally conductive elastomer comprising:
a raised portion that is configured to contact the battery and to deform to allow the expansion of the battery, and
a base that contacts the flange portion.

17. The apparatus of claim 16, wherein the opening and the raised portion are configured to allow the expansion of the battery in a thickness direction.

18. The apparatus of claim 17, wherein the thermally conductive elastomer further comprises a pocket portion that is configured to deform to allow the expansion of the battery in the thickness direction.

19. The apparatus of claim 18, further comprising:
a plate that contacts the base of the thermally conductive elastomer, wherein the pocket portion is between the plate and the raised portion of the thermally conductive elastomer.

20. The apparatus of claim 19, wherein the plate includes a cutout portion and the thermally conductive elastomer include a protrusion that is attached to the cutout portion to attach the thermally conductive elastomer to the plate.

* * * * *